United States Patent
Haase et al.

(10) Patent No.: US 7,720,324 B2
(45) Date of Patent: May 18, 2010

(54) OPTICAL STRAIN GAUGE STRIPS

(75) Inventors: Karl-Heinz Haase, Pfungstadt (DE); Michael Schmidt, Wettenberg (DE); Regis Blin, Giessen (DE)

(73) Assignee: Hottinger Baldwin Messtechnik GmbH, Darmstadt (DE)

( * ) Notice: Subject to any disclaimer, the term of this patent is extended or adjusted under 35 U.S.C. 154(b) by 0 days.

(21) Appl. No.: 11/922,943

(22) PCT Filed: Jun. 27, 2006

(86) PCT No.: PCT/EP2006/006213
§ 371 (c)(1),
(2), (4) Date: Feb. 20, 2008

(87) PCT Pub. No.: WO2007/000323
PCT Pub. Date: Jan. 4, 2007

(65) Prior Publication Data
US 2009/0080829 A1    Mar. 26, 2009

(30) Foreign Application Priority Data
Jun. 29, 2005 (DE) .................. 10 2005 030 753

(51) Int. Cl.
*G02B 6/34* (2006.01)
*G02B 6/00* (2006.01)

(52) U.S. Cl. .......................................... 385/13; 385/37
(58) Field of Classification Search ................... 385/12, 385/13, 37
See application file for complete search history.

(56) References Cited

U.S. PATENT DOCUMENTS

| 5,726,744 | A | 3/1998 | Ferdinand et al. | |
| 6,586,722 | B1 * | 7/2003 | Kenny et al. | ........... 250/227.16 |
| 2002/0028034 | A1 * | 3/2002 | Chen et al. | ..................... 385/12 |

FOREIGN PATENT DOCUMENTS

| EP | 0 892 250 | 1/1999 |
| EP | 1 129 327 | 9/2001 |
| FR | 2 864 202 | 6/2005 |

* cited by examiner

*Primary Examiner*—Daniel Petkovsek
(74) *Attorney, Agent, or Firm*—W. F. Fasse; W. G. Fasse

(57) ABSTRACT

An optical strain gage (1) for multi-axis strain measurement includes at least two linear light waveguide sections (2, 3, 4) with Bragg gratings (5). These are arranged next to one another in a prescribed angle (19) of 90° or 45° on a support layer (6) and are supplied with lightwaves by a common infeeding waveguide section (7). All of the light waveguide sections(2, 3, 4, 7) are provided preferably linearly on the support layer (6), and a beam dispersion element (8) is arranged between the infeeding waveguide section (7) and the measuring waveguide sections (2, 3, 4) containing the Bragg grating (5).

10 Claims, 2 Drawing Sheets

OPTICAL STRAIN GAUGE STRIPS

FIELD OF THE INVENTION

The invention relates to an optical strain gage for detecting a multi-axis strain and to a method of producing such an optical strain gage.

BACKGROUND INFORMATION

Electrical strain gages are frequently utilized for the measurement-technology evaluation of forces or for the monitoring of mechanically loaded structural components. The strain gages detect the strain of structural elements impinged or acted on by force. Such electrical strain gages usually consist of photolithographically produced meander-shaped measuring grids of an electrical resistance material that is applied on a support film of synthetic plastic and is usually covered with a further synthetic plastic protective film for mechanical protection. These electrical strain gages are applied on a deformation body for the detection of a load-dependent strain and convert the strain, through a resistance variation of the measuring grid, into an electrical signal that is proportional to the strain or the force influence.

Normally strain gages that are embodied as so-called rosettes are utilized for the biaxial measurement of strains. In that regard, usually two or three individual measuring grids are arranged on a common support film, which are usually offset from one another at 45°, 60° or 90° angles. Such strain-measuring rosettes are mostly used for measuring the magnitude of the strain or force along and perpendicular to a main axis or to determine the orientation of the main axis. In that regard, T-rosettes with two measuring grids are known, which are arranged offset 90° relative to one another. These are predominantly utilized for this if a biaxial stress condition exists, of which the main direction is known. Rosettes with three measuring grids are mostly used for determining a biaxial stress condition of which the main stress directions are unknown. In that regard, the measuring grids must be arranged as near as possible to one another in order to be able to detect the same strains at the same location, whereby only therewith an exact measurement can be ensured. Therefore, such known rectangular rosettes with three measuring grids are rarely larger than 10×20 mm. However, such electrical strain gages are very sensitive with respect to electromagnetic fields or high voltage related influences and also may not be utilized in areas subject to the danger of explosion.

Such a sensor for the high voltage and electromagnetically insensitive detection of biaxial mechanical stresses is known from the EP 1 129 327 B1, which optically determines the strains to be measured. For that purpose optical waveguides are provided, which consist of optical fibers. So-called Bragg gratings are written or introduced into these optical fibers, and these Bragg gratings produce a reflection wavelength that is proportional to the detected strain. These optical fibers with impressed Bragg gratings are embedded in a support layer of epoxide resin or adhesively bonded onto plates. This support layer can then be secured onto the surface of deformation bodies and thus transmits the strain acting on this support layer onto the strain-measuring Bragg gratings. Due to a strain, the reflected Bragg wavelength varies or changes corresponding to the strain and can be detected. This optical strain sensor is embodied as a rosette for the measurement of a biaxial stress and consists of a light waveguide with at least two or three Bragg gratings that are arranged one behind another, and that are oriented at angles of 45°, 60° or 90° relative to one another, and thereby can detect the strains of deformation bodies like electrical strain gage rosettes. In that regard, the connection sections of the waveguide between the Bragg gratings are guided in a curve or arc shape and may not fall below certain radii of curvature due to the reflection losses. For minimizing the radii of curvature it is additionally suggested to strongly taper the bent or curved connection sections, since thereby the reflection losses can be reduced. However, the connection sections of the waveguides between the Bragg gratings are apparently still considerably longer than the strain-measuring Bragg gratings themselves, which already require a length of approximately 10 mm. Therefore, such rosettes of optical fibers with two or three Bragg gratings on a common support layer, with comparable accuracy, still require a considerably larger application surface than is required with electrical strain gage rosettes.

SUMMARY OF THE INVENTION

Therefore, the invention is based on the underlying object to provide pre-fabricated strain gages made of optical light waveguides for biaxial strain measurement, which comprise a compact structural configuration with high measuring accuracy.

This object is achieved by the invention as disclosed and claimed herein.

The invention has the advantage that very flat or shallow optical strain gages are producible through the fixation of the optical waveguides with the Bragg gratings in provided guide channels on a support film. Especially through the beam spreading or dispersion elements it is possible to save structural space on the support layer without long deflection bows or arcs in the connection sections, whereby especially strain gage rosettes that comprise a compactness of electrical strain gage rosettes are made possible.

Through the use of the beam dispersion element simultaneously all waveguide sections can be linearly embodied, so that the rosette size primarily results only still from the length of the Bragg gratings, since the beam dispersion elements with the injection or infeeding section comprise only a small structural length. Thereby very small surface area optical strain gages advantageously arise. Since the beam dispersion elements each respectively also only comprise a very small cross-sectional area, which is not significantly larger than the waveguides themselves, these are also advantageously integratable into a thin support film.

Through the use of the beam dispersion element also only one common injecting or infeeding waveguide is necessary for the infeeding and outfeeding of light, so that especially at longer distances between the measuring locations and the evaluating units, and for multi-location measurements, considerable lengths of connection lines can advantageously be saved.

The invention furthermore has the advantage that the provided guide channels are preferably producible or fabricatable very accurately through a photolithographic etching process or a mechanical machining process, so that such optical strain gages comprise a high reproduction accuracy and also can be pre-fabricated economically as series parts in large piece counts, in order to be applicable in a simple manner on provided deformation bodies or other strain bodies. Such pre-fabricated flat or shallow and small-surface-area optical strain gages can also advantageously be secured in or on fiber reinforced composite materials, whereby these only slightly impair the fiber structure and advantageously also withstand strain changes up to 10% without damage, as they are typical with deformation bodies of fiber reinforced composite materials.

The inventive optical strain gages have the advantage relative to electrical strain gages, that they are largely or substantially insensitive with respect to electromagnetic fields high voltage areas. In that regard, they advantageously have no current supply, so that they are insensitive with respect to power fluctuations over the transmission distance and may also be utilized in areas subject to a danger of explosion. Moreover, the force-locked or force-transmitting connection of the Bragg gratings in the guide channels makes possible an enclosed connection structure with the surficial support film, so that a good and defined force transmission to the Bragg gratings is ensured, whereby a high measuring accuracy and especially a low hysteresis effect is achievable.

A particular embodiment of the invention, in which the optical waveguides are full-surface cast into the guide channels, has the advantage that thereby very simply producible optical strain gages can be fabricated. Since these optical strain gages are also producible of ceramic or glass support films and the optical waveguides are producible from glass materials, these can advantageously also be utilized at very high temperature loadings.

In a particular manner of embodiment of the invention with additional Bragg gratings for the temperature compensation, it is advantageous that thereby a temperature independent strain measurement becomes possible. Therewith a separate temperature detection can also simultaneously be carried out, whereby advantageously also the thermal overloading of the optical strain gage and the adjoining remaining structural elements can be recognized.

BRIEF DESCRIPTION OF THE DRAWINGS

The invention will be explained in more detail in connection with an example embodiment, which is illustrated in the drawing, wherein.

DETAILED DESCRIPTION OF AN EXAMPLE EMBODIMENT OF THE INVENTION

Figure 1:
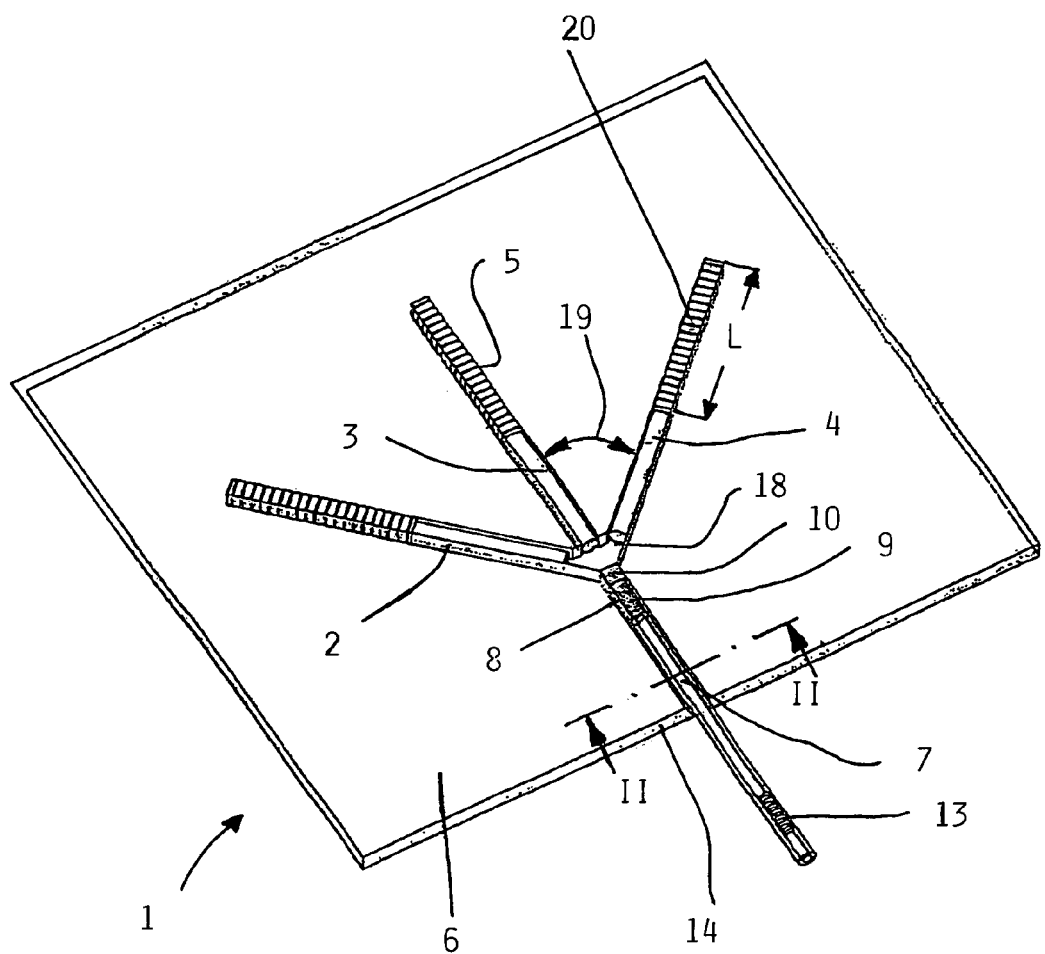
FIG. 1: shows the top plan view onto an optical rosette-like strain gage.

An optical strain gage 1 is illustrated in FIG. 1 of the drawing, which is embodied as a rosette for the biaxial strain measurement and which consists of three measuring waveguide sections 2, 3, 4 arranged next to one another and with impressed Bragg gratings 5, which are fed or supplied by an injecting or infeeding waveguide 7, of which the lightwave signals are transmitted through a beam spreading or dispersing element 8.

The light waveguides 2, 3, 4 are all embodied as linear sections and are embedded or led into a common support layer 6, which is embodied as a support film. In that regard, the light waveguide sections consist of an infeeding waveguide and three further transmitting sections of measuring waveguides 2, 3, 4 with preferably impressed Bragg gratings 5. For receiving the light waveguides 2, 3, 4, a thin support film 6 is provided, which preferably consists of a hard and elastic synthetic plastic, such as polyimide for example. The support film 6 may, however, also be fabricated of other hard elastic synthetic plastics, glass, ceramics or metals. In that regard, the support film 6 preferably serves for applying the pre-fabricated optical strain gages 1 on provided deformation bodies or for integrating the pre-fabricated optical strain gages 1 in a position-correct and force-locking or force-transmitting manner in loaded structural elements. In that regard, the support film 6 is embodied planar, preferably has a rectangular or quadratic base surface and a thickness of approximately 0.55 mm. The base surface is essentially oriented in accordance with the length of the measuring light waveguide sections 2, 3, 4 with the Bragg gratings 5 and the angular arrangement and the number of the measuring sections.

In the illustrated example embodiment of an optical strain gage 1 for the biaxial strain detection by means of three angularly offset arranged Bragg gratings 5, a size of the support film 6 of approximately 18×20 mm is provided. This arises essentially from the necessary length of the Bragg gratings of approximately 10 mm for a sufficient noise to useful signal ratio. Through reduction of the noise to useful signal ratio or an improvement of the evaluating unit and shortening of the injecting or infeeding sections of the light waveguides 2, 3, 4, thereby significantly smaller base surfaces of the support film 6 of approximately 9×10 mm are possible, which are still comparable to electrical strain gage rosettes with regard to their measuring accuracy.

For fixing the light waveguides 2, 3, 4, 7, guide channels 11 or recesses are worked or processed into the support films 6, and the cross-section of the guide channels at least corresponds to the cross-section of the light waveguides 2, 3, 4, 7. For that purpose, preferably optical waveguides 2, 3, 4, 7 of glass fibers with a diameter of 0.25 mm are used, so that the guide channels 11 or recesses in the injection or infeeding area comprise at least a depth and width of 0.25 mm.

Figure 2:
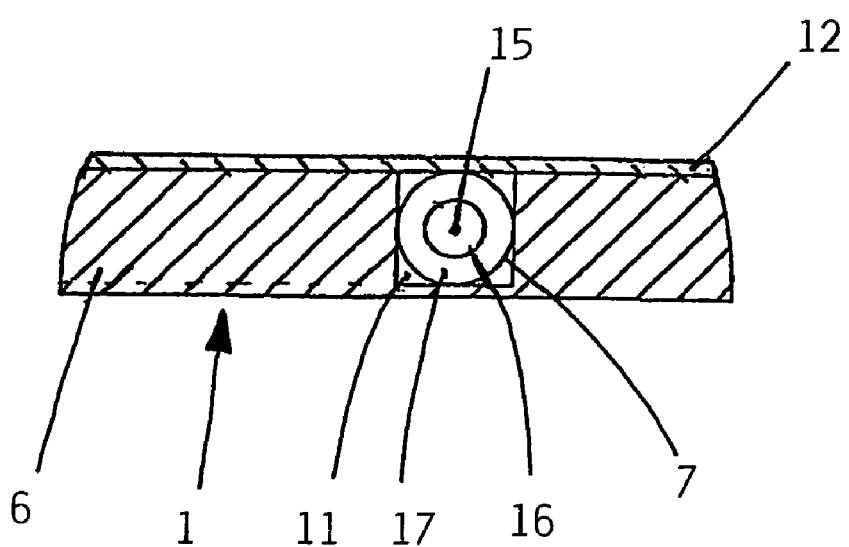
FIG. 2: shows a cut-out section of a sectional image in a front view through the infeeding area of the optical strain gage.

The arrangement of the light waveguide 7 in the infeeding area is shown in more detail in FIG. 2 of the drawing. From the cut-out section of the sectional view II-II as indicated in FIG. 1, it can be seen in FIG. 2 that in the infeeding area the injecting or infeeding waveguide 7 is completely integrated into the support film 6, since it completely fills out the guide channel 11 provided there. The guide channels 11 are preferably worked or processed into the support film 6 by a photo-lithographic etching process. There are, however, also mechanical or thermal methods that are known, with which the fine guide channels 11 can be worked or processed into the support film 6 by a material removal.

The light waveguides 2, 3, 4, 7 involve conventional optical light waveguide fibers of glass fibers, as they are also used for telecommunication as a single-mode fiber with a wavelength of preferably $\lambda$=1550 nanometers. These optical fibers 2, 3, 4, 7 preferably consist of a fiber core 15, a fiber sheath 16 and a fiber protective layer 17, which can also be omitted. The light injection or infeeding is achieved through a single injecting or infeeding waveguide 7, which is linearly embedded or laid into the support film 6 from a longitudinal edge 14 of the support film 6. For this purpose, this infeeding waveguide 7 is embedded or laid approximately 4 mm into the pre-fabricated guide channel 11 approximately in the middle of the support film 6 and is fixed in the guide channel 11. At the end of this infeeding waveguide 7, a gradient index lens 9 (GRIN lens) and a sinusoidal transmission phase grating 10 is provided as a beam dispersion element 8. Thereby the GRIN lens 9 spreads or disperses the light beam onto a diameter surface of 150 to 500 µm.

In the transmission phase grating 10 arranged directly adjoining thereon, a diffraction of the lightwaves then occurs, so that these are diffracted in the $0^{th}$ and +/−$1^{st}$ order of diffraction of the phase grating. These orders of diffraction respectively lie at −45°, 0° and +45° angles 19 relative to one another. The further transmitting linear guide channels 18 are formed or let into the support film 6 in the orders of diffraction in angular spacings 19 of 45° for the measuring light waveguide sections 2, 3, 4. These guide channels 18 comprise approximately a length of 10 mm and a cross-sectional surface of preferably 0.125×0.125 mm. These waveguide sections 2, 3, 4 consist of an optical fiber with a core 15 and a sheath 16, a photoresist of synthetic plastic or a glass material. So-called Bragg gratings 5 are preferably impressed into these measuring waveguide sections 2, 3, 4 at the ends thereof, whereby the Bragg gratings 5 all comprise a different grating period Λ.

The beam dispersion element 8 may, however, also consist of only the GRIN lens 9. Then the further transmitting measuring waveguide sections 2, 3, 4 would directly adjoin onto the GRIN lens 9, and would be brought in plural angular steps to a branching of −45° and +45°. Thereby, also the measuring light waveguide sections 2, 3, 4 are connected in a force-transmitting and forming-fitting manner with the support film 6 in the guide channels 18. This can be achieved by pressing-in or by gluing or adhesive bonding preferably with a curable epoxide resin adhesive. At least the part with the guide channels 10, 18 is covered with an additional thin protective film 12 as a protective layer for the protection against moisture influences and mechanical impairments. The protective film 12 preferably consists of the same material as the support film 6 and comprises a thickness of preferably 0.05 mm.

In a further manner of embodiment of the invention, the measuring light waveguide sections 2, 3, 4 are embodied as planar light waveguides, that are preferably cast in the guide channels 18. For that purpose, for example an optically conductive polymer substrate or a different so-called photoresist are introduced into the guide channels 18 a synthetic plastic support film 6, whereby the polymer substrate or photoresist comprises a higher refractive index than the support film 6. Thereby there arises a refractive index jump or discontinuity, through which the polymer substrate as a light conductive synthetic plastic acts as a light waveguide. In that regard, the polymer substrate basically represents the core and the support film 6 represents the sheath with the lower refractive index. Especially with rectangular or quadratic guide channels 18, through the introduction of the light conductive substrate, in a simple manner this produces an optical waveguide strip, which is suitable for the light conductance of certain wavelengths like a glass fiber. In this manner of embodiment, before the introduction of the light conductive layer, strip-shaped irregularities 20 are impressed at a spacing distance Λ in the guide channels 18, and these irregularities 20 then act as Bragg gratings 5. These can represent comb-like projections or elevations or also recesses or depressions, which over a length L of 3 to 10 mm form a Bragg grating 5, which reflects the injected lightwaves with a prescribed wavelength $\lambda_B$. Because the light waveguides 2, 3, 4 in the guide channels 18 of the support layer 6 are fixedly embedded or let-in or cast-in and fixedly connected therewith, thereby all strains acting on the support layer 6 can also be exactly detected.

Such embodiments of optically conductive media let into the guide channels 18 as light waveguides 2, 3, 4 can also be carried out with heat resistant glass or ceramic films as the support layer 6, into the channels 18 of which photonic crystals with quartz glass substrates are cast. For that purpose, the Bragg gratings are embodied with the aid of the photonic crystals, and with the Bragg gratings the strain is detectable. The channels can preferably also be realized by a field-supported ion exchange. The Bragg gratings are then introduced from the outside into these channels by a chemical etching process. Such embodiments of optical strain gages can be utilized at temperatures up to 900° C.

A further fourth Bragg grating 13 with a separate grating period $\Lambda_T$ is impressed on the injecting or infeeding waveguide 7 outside of the support film 6, and serves for the temperature compensation. For the lightwave injection or infeeding and for the detection of the light signals reflected on the Bragg gratings 5, the infeeding waveguide 7 is connected with an evaluating unit that is not shown and that includes a spectrometer or especially a tunable high resolution Fabry-Perot filter.

Such an optical strain gage 1 can both be applied on metallic deformation bodies like conventional electrical stain gages, and also be embedded in or glued onto fiber reinforced composite materials. Not only strain-dependent force measurements but also temperature measurements are possible with such optical strain gages 1, because simultaneously also the thermal expansion is detectable.

If such an optical strain gage 1 is applied on a force-impinged deformation body, then an applied force or strain can thereby be detected as described in the following. Namely through the force acting on the strain body a strain effect arises on the surface thereof, and this strain effect is transmitted via the support film 6 applied thereon to the optical waveguides 2, 3, 4 fixed in a force-transmitting manner therein. Thereby a length variation also arises within the Bragg grating area 5, since this is formed from a piece of the core 15 of the optical fiber 2, 3, 4, which is surrounded by the sheath 16, which comprises a lower refractive index than the core 15. The optical fibers 2, 3, 4 are embodied as a single-mode fiber, in which the diameter of the fiber core 15 is sufficiently small at 9 μm, so that the light originating from a preferably infrared light source can only spread out and propagate in a single mode along the core 15. This single mode is essentially conducted and guided by the core-sheath boundary. The lines 20 of the Bragg grating 5 are a row or series of preferably regularly spaced interferences of the effective refractive index n of the core 15. The Bragg grating 5 extends along a length L of the light waveguides 2, 3, 4 and comprises preferably a length L of 10 mm, whereby L may however also amount to 1 to 20 mm.

Various different methods can be utilized for the production of Bragg gratings 5. In one of these methods, the interferences of the refractive index n in the core 15 are produced in that the optical fibers 2, 3, 4 are masked with a phase mask and are irradiated with strong ultraviolet light. In a different method, the index interferences n are formed in that the optical fibers 2, 3, 4 are subjected to an interference pattern that is produced by two mutually intersecting halves of a UV laser beam. The spacing distance Λ between the index interferences n is determined by the angle at which the two halves of the beam intersect each other. The interferences of the core refractive index n effectuated by these methods normally lie in the order of magnitude of one thousandths or lower.

The optical fibers 2, 3, 4 used for the fabrication of the Bragg gratings 5 generally have a protective layer 17 outside of the sheath 16, which protective layer preferably consists of a polymer and has no significance for the actual light conducting or guiding function. This protective layer 17 is removed before the optical fiber 2, 3, 4 is subjected to the UV light for the formation of the Bragg grating 5. After the irradiation, the stripped part of the optical fibers 2, 3, 4 can also be newly coated in order to again produce its durability, as with the fourth fiber Bragg grating 13 of the injecting or infeeding waveguide 7.

If a broad light spectrum as an input signal is supplied to the Bragg grating 5, most of the wavelengths penetrate through the grating region and form a transmitted output signal. However, for components of the input signal, the periodic interferences of the refractive index n produce a strong Bragg reflection with the wavelength $\lambda_B$ of the so-called Bragg wavelength, which is given according to the formula $\lambda_B=2n\Lambda$, whereby n represents the effective refractive index and $\Lambda$ represents the grating period.

The lightwave signals reflected by the Bragg grating 5 can be detected with a spectrometer or a so-called Fabry-Perot filter. In that regard, the wavelength $\lambda$ at which a peak in reflection arises, represents a value that is dependent on the grating period $\Lambda$. If a longitudinal strain acts on the Bragg grating 5, the spacing distance $\Lambda$ changes, so that the Bragg wavelength $\lambda_B$ shifts. In that regard, the Bragg wavelength $\lambda_B$ behaves approximately proportional to the strain along the longitudinal axis of the light waveguides 2, 3, 4. Thus, the wavelength change $\Delta\lambda_B$ is a measure for the force introduced into the deformation body. Therefore such optical strain gages 1 can be utilized, similarly like electrical strain gages, on provided deformation bodies, preferably also in load cells, rotational moment or torque shafts or other force transducers. However, such optical strain gages 1 are also useable in loading tests for example in the field of air and space flight, where the optical strain gages 1 are then applied directly on the loaded structural components, whereby especially the inventive rosettes are advantageous for the measurement of the unknown force introduction directions. However, such optical strain gages 1 are also utilizable for the monitoring of the operating condition of loaded structural components, whereby such strain gages can detect a fatigue damage or a crack formation upon the exceeding of a prescribed limit strain.

However, for the detection of the strain-dependent loading, a special spectral evaluating unit is provided with a Fabry-Perot filter for example. The evaluating unit basically represents a transmitting and receiving unit for light waveguides 2, 3, 4, in which the wavelength $\lambda_B$ reflected from the fiber Bragg grating 5 is detected by means of the evaluating unit. In that regard, first in the unloaded condition, a broadband light signal with a wavelength $\lambda$ of preferably approximately 1525 to 1575 nm is fed into the light waveguides 2, 3, 4 by means of a preferably infrared light source as a transmitting unit. Now, through the Bragg grating 5 due to the relationship $\lambda_B=2n\Lambda$, respectively a predetermined wavelength $\lambda_{B0}$ is reflected, which is separated from the radiated light signals in a coupler. With the aid of a following known Fabry-Perot filter in the receiving unit or a different spectrometer unit, the reflected lightwave signals can then be detected with a resolution of 1 pm and be electronically stored or can be displayed or indicated in a display apparatus as a reference value $\lambda_{B0}$.

If now a load-dependent strain arises on the deformation body, which causes a length change of the light waveguide 2, 3, 4 via the applied support film 6, then the respective reflected wavelength $\lambda_{B1}$ of the Bragg grating 5 also changes via the grating period $\Lambda$, which wavelength is similarly detected with the aid of the Fabry-Perot filter. If now the difference is formed from the respective reference Bragg grating wavelength $\lambda_{B0}-\lambda_{B1}$, then one obtains a value that is proportional to the strain or to the loading force and that can be indicated or displayed in a display apparatus as strain or force. In that regard, with the present rosette of the three optical fibers 2, 3, 4 arranged next to one another at an angle of 45° relative to one another, all three strain or force components are separately evaluated and are calculated as individual force components or as resulting force via their known angular position as with electrical strain gage rosettes.

However, such a strain or force detection is only sufficiently accurate if the surrounding ambient temperature is always uniformly constantly staying the same, because such Bragg gratings 5 also change their reflected wavelength $\lambda_B$ proportional to the surrounding ambient temperature. Therefore, one can basically also measure the temperature T without load-dependent strain with such optical strain gages 1. Namely the Bragg wavelength $\lambda_B$ shifts as a function of the strain $\epsilon$ and the temperature T according to the relationship:

$$\Delta\lambda_B = K_E \times \epsilon + K_T \times \Delta T$$

wherein:
  $K_E$=the sensitivity factor of the strain;
  $\epsilon$=the strain;
  $K_T$=the sensitivity factor of the temperature; and
  $\Delta T$=the temperature change.

However, since one cannot distinguish between the temperature-induced and strain-induced Bragg wavelength change $\Delta\lambda_B$ according to the above relationship, and a temperature constancy that always remains the same is not always maintainable, additionally a fourth Bragg grating 13 is still provided in the injecting or infeeding waveguide 7 for the temperature compensation. Thus, through this fourth Bragg grating 13, a further wavelength change $\Delta\lambda_{BT}$ ($\lambda_{BT}=K_T\Delta T$) that is only temperature-dependent is detected with the aid of a receiving unit, and the temperature-dependent wavelength change $\Delta\lambda_{BT}$ is subtracted from the strain-induced and temperature-induced wavelength changes $\Delta\lambda_B$ through a calculating or computing element for the temperature compensation. Thereby one obtains a very exact measured value of the strain or force, which is independent of the temperature of the optical strain gage 1.

Moreover, optical strain gages 1 are also embodiable, in which several rosettes are simultaneously arranged on a larger support film surface, which make possible a surfacial strain detection, in order to determine an analysis of the stress progression also on complicated structural parts, for example.

The invention claimed is:

1. Optical strain gage for multi-axis strain measurement comprising at least two measuring waveguide sections with Bragg gratings, which are arranged in at least one prescribed angle next to one another on a support layer and are supplied with lightwaves from a common infeeding waveguide section, wherein all of the waveguide sections are embodied linearly on the support layer, and further comprising a beam dispersion element arranged between the infeeding waveguide section and the measuring waveguide sections, wherein all of the waveguide sections and the beam dispersion element are integrated in the thin support layer, all of the waveguide sections are linear waveguide sections, and the support layer is a thin support layer embodied as a support film.

2. Optical strain gage according to claim 1, wherein the strain gage is embodied as a rosette, which comprises two or three of the measuring waveguide sections that are arranged next to one another and angularly offset, and that respectively include a Bragg grating of differing grating period, and that run together before the beam dispersion element.

3. Optical strain gage according to claim 1, wherein the support film consists of metal, glass, ceramic or a hard elastic synthetic plastic, into which guide channels are recessed for receiving the waveguide sections and the beam dispersion element, and wherein the guide channels have cross-sections that are round, cornered or angled, or V-shaped and have a diameter that at least corresponds to a diameter of the waveguide sections with the Bragg gratings.

4. Optical strain gage according to claim 3, wherein the measuring waveguide sections are embodied as optically conductive glass fibers and are pressed or glued in a force-transmitting manner in the guide channels for the strain detection with the Bragg gratings.

5. Optical strain gage according to claim 3, wherein the measuring waveguide sections are embodied as optically conductive synthetic plastic or optically conductive glass, which has a refractive index higher than a refractive index of the support film, and are fixedly cast or inserted into the guide channels and comprise the Bragg grating in end regions thereof.

6. Optical strain gage according to claim 3, further comprising a covering film as a cover layer, wherein the support film is embodied quadratic or rectangular and is fixedly connected with the covering film as the cover layer, whereby the covering film covers at least the guide channels with the waveguide sections and the beam dispersion element.

7. Method of producing an optical strain gage according to claim 6, comprising
- working at least three of the guide channels as linear guide channels into the support film that is cut-out to a provided surface area through an etching or mechanical material removal production process,
- securing the measuring waveguides with the Bragg gratings and the beam dispersion element as well as the infeeding waveguide into the guide channels in a force-transmitting and form-fitting manner, and
- sealing at least the guide channels with a cover layer.

8. Optical strain gage according to claim 1, further comprising an additional Bragg grating for temperature compensation arranged strain-independent outside of the support film in the infeeding waveguide.

9. Optical strain gage for multi-axis strain measurement comprising at least two measuring waveguide sections with Bragg gratings, which are arranged in at least one prescribed angle next to one another on a support layer and are supplied with lightwaves from a common infeeding waveguide section, wherein all of the waveguide sections are embodied linearly on the support layer, and further comprising a beam dispersion element arranged between the infeeding waveguide section and the measuring waveguide sections, wherein the strain gage is embodied as a rosette, which comprises two or three of the measuring waveguide sections that are arranged next to one another and angularly offset, and that respectively include a Bragg grating of differing grating period, and that run together before the beam dispersion element, and wherein particularly the rosette consists of two of the measuring waveguide sections that form an angle of 90° with one another, or of three of the measuring waveguide sections of which the respective neighboring two waveguide sections form an angle of 45° with one another.

10. Optical strain gage for multi-axis strain measurement comprising at least two measuring waveguide sections with Bragg gratings, which are arranged in at least one prescribed angle next to one another on a support layer and are supplied with lightwaves from a common infeeding waveguide section, wherein all of the waveguide sections are embodied linearly on the support layer, and further comprising a beam dispersion element arranged between the infeeding waveguide section and the measuring waveguide sections, wherein the beam dispersion element comprises a gradient index lens and a sinusoidal transmission phase grating or only a gradient index lens arranged at an end of the common infeeding waveguide section.

* * * * *